US006429248B2

(12) United States Patent
Schwark et al.

(10) Patent No.: US 6,429,248 B2
(45) Date of Patent: Aug. 6, 2002

(54) COATING COMPOSITION CONTAINING ELECTRICALLY-CONDUCTIVE POLYMER AND SOLVENT MIXTURE

(75) Inventors: Dwight W. Schwark; Debasis Majumdar, both of Rochester; Charles C. Anderson, Penfield; Robert J. Kress, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/880,384

(22) Filed: Jun. 13, 2001

Related U.S. Application Data

(62) Division of application No. 09/386,526, filed on Aug. 30, 1999.

(51) Int. Cl.[7] ............................ C08K 5/10; C08K 5/07; C08K 5/06

(52) U.S. Cl. ....................... 524/315; 524/361; 524/377; 524/389; 524/391; 524/484

(58) Field of Search ................................ 524/315, 361, 524/377, 389, 391, 484

(56) References Cited

U.S. PATENT DOCUMENTS

| | | | | |
|---|---|---|---|---|
| 2,271,234 | A | 1/1942 | Staud et al. | |
| 2,327,828 | A | 8/1943 | Simons | |
| 2,801,191 | A | 7/1957 | Nadeau et al. | |
| 4,070,189 | A | 1/1978 | Kelley et al. | 430/527 |
| 4,731,408 | A | 3/1988 | Jasne | |
| 4,959,430 | A | 9/1990 | Jonas et al. | |
| 4,987,042 | A | 1/1991 | Jonas et al. | |
| 4,990,276 | A | 2/1991 | Bishop et al. | |
| 5,035,926 | A | 7/1991 | Jonas et al. | |
| 5,093,439 | A | 3/1992 | Epstein et al. | |
| 5,254,446 | A | 10/1993 | Ikenoue et al. | |
| 5,300,575 | A | 4/1994 | Jonas et al. | |
| 5,300,676 | A | 4/1994 | Andree et al. | |
| 5,312,681 | A | 5/1994 | Muys et al. | |
| 5,326,688 | A | 7/1994 | Stimson et al. | 430/528 |
| 5,354,613 | A | 10/1994 | Quintens et al. | |
| 5,370,981 | A | 12/1994 | Krafft et al. | |
| 5,372,924 | A | 12/1994 | Quintens et al. | |
| 5,391,472 | A | 2/1995 | Muys et al. | |
| 5,403,467 | A | 4/1995 | Jonas et al. | |
| 5,443,944 | A | 8/1995 | Krafft et al. | |
| 5,463,056 | A | 10/1995 | Jonas | |
| 5,575,898 | A | 11/1996 | Wolf et al. | |
| 5,597,680 | A | 1/1997 | Wang et al. | |
| 5,597,681 | A | 1/1997 | Anderson et al. | |
| 5,665,498 | A | 9/1997 | Savage et al. | |
| 5,674,654 | A | 10/1997 | Zumbulyadis et al. | |
| 5,679,505 | A | 10/1997 | Tinglerl et al. | |
| 5,716,550 | A | 2/1998 | Gardner et al. | |
| 5,718,995 | A | 2/1998 | Eichorst et al. | |
| 5,747,412 | A | 5/1998 | Leenders et al. | |

FOREIGN PATENT DOCUMENTS

| | | |
|---|---|---|
| DE | 42 11 459 | 10/1993 |
| DE | 42 38 628 | 7/1994 |
| EP | 0 251 531 | 1/1988 |
| EP | 0 459 349 A1 | 12/1991 |
| EP | 0 758 671 | 2/1997 |

*Primary Examiner*—Kriellion A. Sanders
(74) *Attorney, Agent, or Firm*—Doreen M. Wells

(57) ABSTRACT

A coating composition comprising a solution of an electrically-conductive polymer and an organic solvent media wherein the solvents are selected from the group consisting of alcohols, ketones, cycloalkanes, arenes, esters, glycol ethers and their mixtures; the media having a water content of less than 12 weight percent. Such a coating composition provides a means to protect an imaging element against the accumulation of static electrical charges before and after image processing while also providing the element with improved manufacturability and physical properties.

18 Claims, No Drawings

COATING COMPOSITION CONTAINING ELECTRICALLY-CONDUCTIVE POLYMER AND SOLVENT MIXTURE

CROSS REFERENCE TO RELATED APPLICATIONS

This is a divisional of application Ser. No. 09/386,526, filed Aug. 30, 1999.

FIELD OF THE INVENTION

This invention relates to a coating composition useful in preparing imaging elements such as photographic, electrophotographic, and thermal imaging elements. More specifically, this invention relates to a coating composition containing an electrically-conductive polymer and an organic solvent media, where the solvents are selected from the group consisting of alcohols, ketones, cycloalkanes, arenes, esters, glycol ethers and their mixtures, and the media has less than twelve weight percent water.

BACKGROUND OF THE INVENTION

The problem of controlling static charge is well known in the field of photography. The accumulation of charge on film or paper surfaces leads to the attraction of dirt which can produce physical defects. The discharge of accumulated charge during or after the application of the sensitized emulsion layer(s) can produce irregular fog patterns or "static marks" in the emulsion. Static problems have been aggravated by increases in the sensitivity of new emulsions, increases in coating machine speeds, and increases in post-coating drying efficiency. The charge generated during the coating process may accumulate during winding and unwinding operations, during transport through the coating machines and during finishing operations such as slitting and spooling. Static charge can also be generated during the use of the finished photographic film product by both the customer and photofinisher. In an automatic camera, the winding of roll film in and out of the film cartridge, especially in a low relative humidity environment, can result in static charging. Similarly, high speed automated film processing can result in static charge generation. Sheet films (e.g., x-ray films) are especially susceptible to static charging during removal from light-tight packaging.

It is generally known that electrostatic charge can be dissipated effectively by incorporating one or more electrically-conductive "antistatic" layers into the film structure. Antistatic layers can be applied to one or to both sides of the film base as subbing layers either beneath or on the side opposite to the light-sensitive silver halide emulsion layers. An antistatic layer can alternatively be applied as an outermost coated layer either over the emulsion layers or on the side of the film base opposite to the emulsion layers or both. For some applications, the antistatic agent can be incorporated into the emulsion layers. Alternatively, the antistatic agent can be directly incorporated into the film base itself.

A wide variety of electrically-conductive materials can be formulated into coating compositions and thereby incorporated into antistatic layers to produce a wide range of conductivities. These can be divided into two broad groups: (i) ionic conductors and (ii) electronic conductors.

Most of the traditional antistatic layers comprise ionic conductors. Thus, charge is transferred in ionic conductors by the bulk diffusion of charged species through an electrolyte. The prior art describes numerous simple inorganic salts, alkali metal salts of surfactants, ionic conductive polymers, polymeric electrolytes containing alkali metal salts, and colloidal metal oxide sols stabilized by metal salts. Conductivity of most ionically conductive antistatic agents is generally strongly dependent upon temperature and relative humidity of the environment as well as the moisture in the antistatic layer. Because of their water solubility, many simple ionic conductors are usually leached out of antistatic layers during processing, thereby lessening their effectiveness.

Antistatic layers employing electronic conductors have also been described in the art. Because the conductivity depends predominantly upon electronic mobilities rather than ionic mobilities, the observed electronic conductivity is independent of relative humidity and other environmental conditions. Such antistatic layers can contain high volume percentages of electronically conductive materials including metal oxides, doped metal oxides, conductive carbon particles or semi-conductive inorganic particles. While such materials are less affected by the environment, a lengthy milling process is often required to reduce the particle size range of oxides to a level that will provide a transparent antistatic coating needed in most imaging elements. Additionally, the resulting coatings are abrasive to finishing equipment given the high volume percentages of the electronically conductive materials.

Electrically-conductive polymers have recently received attention from various industries because of their electronic conductivity. Although many of these polymers are highly colored and are less suited for photographic applications, some of these electrically-conductive polymers, such as substituted or unsubstituted pyrrole-containing polymers (as mentioned in U.S. Pat. Nos. 5,665,498 and 5,674,654), substituted or unsubstituted thiophene-containing polymers (as mentioned in U.S. Pat. Nos. 4,731,408; 4,959,430; 4,987,042; 5,035,926; 5,300,575; 5,312,681; 5,354,613; 5,370,981; 5,372,924; 5,391,472; 5,403,467; 5,443,944; 5,463,056; 5,575,898; and 5,747,412) and substituted or unsubstituted aniline-containing polymers (as mentioned in U.S. Pat. Nos. 5,716,550 and 5,093,439) are transparent and not prohibitively colored, at least when coated in thin layers at moderate coverage. Because of their electronic conductivity instead of ionic conductivity, these polymers are conductive even at low humidity. Moreover, these polymers can retain sufficient conductivity even after wet chemical processing to provide what is known in the art as "process-surviving" antistatic characteristics to the photographic support they are applied onto. Unlike metal-containing semi-conductive particulate antistatic materials (e.g., antimony-doped tin oxide), the aforementioned electrically-conductive polymers are less abrasive, environmentally more acceptable (due to the absence of heavy metals), and, in general, less expensive.

However, it has been reported that the mechanical strength of a binderless antistat layer comprising substituted or unsubstituted thiophene-containing polymers is not sufficient and can be easily damaged unless a water-soluble or water-dispersible binder is used in the antistat layer (U.S. Pat. Nos. 5,300,575 and 5,354,613). Alternatively, the mechanical strength of an antistat layer comprising only substituted or unsubstituted thiophene-containing polymers can be improved by applying an overcoat layer of a film-forming polymeric material from either an organic solvent solution or an aqueous solution or dispersion (U.S. Pat. No. 5,370,981). A preferred polymeric material for use as an aqueous dispersible binder with such polythiophene containing antistatic layers, or as a protective overcoat layer on such polythiophene-containing antistatic layers is polymethyl methacrylate (U.S. Pat. Nos. 5,354,613 and 5,370,981). However, these binders or protective overcoat layers may be too brittle for certain applications, such as motion picture print films (as illustrated in U.S. Pat. No. 5,679,505).

Alternative polymeric materials for overcoats include cellulose derivatives, polyacrylates, polyurethanes, lacquer systems, polystyrene or copolymers of these materials (as discussed in U.S. Pat. No. 5,370,981). However, according to U.S. Pat. No. 5,370,981, the use of an alkoxysilane is required in either the binderless polythiophene containing antistatic layer, the overcoat layer, or both layers to provide layer adhesion in such a two layer structure.

A variety of water-soluble or water-dispersible polymeric binder materials have been used in polythiophene containing antistat layers. In addition to the aforementioned polymethylmethacrylate, water dispersible materials include hydrophobic polymers with a glass transition temperature (Tg) of at least 40° C. such as homopolymers or copolymers of styrene, vinylidene chloride, vinyl chloride, alkyl acrylates, alkyl methacylates, polyesters, urethane acrylates, acrylamide, and polyethers (as discussed in U.S. Pat. No. 5,354,613). Other water dispersible materials include polyvinylacetate (U.S. Pat. No. 5,300,575) or latex (co)polymers having hydrophilic functionality from groups such as sulphonic or carboxylic acid (U.S. Pat. No. 5,391,472). Water soluble binders include gelatin and polyvinylalcohol (U.S. Pat. No. 5,312,681). Polythiophene containing antistat layers, both in the presence and absence of water-soluble or water-dispersible polymeric binder materials, have been shown to tolerate the addition of water-miscible organic solvents (U.S. Pat. No. 5,300,575). However, the prior polythiophene antistat art only teaches the use of polythiophene in combination with water-soluble or water-dispersible polymeric binder materials prepared via solutions containing a minimum water content of approximately 37 wt % (as seen in U.S. Pat. No. 5,443,944, column 7, lines 1–17, magnetic and antistat layer 6.3 in Example 6). For the case of a binderless polythiophene antistat layer, the prior art (U.S. Pat. Nos. 5,300,575; 5,370,981; and 5,443,944) teaches the use of polythiophene solutions containing water contents of at least 25 wt %. As seen in U.S. Pat. No. 5,443,944, column 3, lines 64–68, 2.2 Antistatic solution 2, the lowest water content of a coating composition shown to form a binderless polythiophene antistatic layer is approximately 12 wt %.

Prior art for substituted or unsubstituted pyrrole-containing polymers (as mentioned in U.S. Pat. Nos. 5,665,498 and 5,674,654) describes the use of these materials dispersed in a film-forming binder. While a broad range of binders useful in antistatic layers is described, examples from these patents only teach the use of aqueous coatings containing polypyrrole and water-dispersible or water-soluble binders.

Prior art for substituted or unsubstituted aniline-containing polymers (as discussed in U.S. Pat. No. 5,716,550) describes the use of the polyaniline complex dissolved in a first solvent and a film-forming binder dissolved in a second different solvent. The solvent systems taught in U.S. Pat. No. 5,716,550, such as solvent blends containing chlorinated solvents, are environmentally undesirable.

What is needed in the art is a more environmentally friendly solvent system in a coating composition that provides process-surviving antistatic characteristics as well as resistance to abrasion and scratching and improved manufacturability, without adding significant coloration to the imaging element.

SUMMARY OF THE INVENTION

The problems noted above are overcome with a coating composition comprising a solution of an electrically-conductive polymer and an organic solvent media wherein the solvents are selected from the group consisting of alcohols, ketones, cycloalkanes, arenes, esters, glycol ethers and their mixtures; the media having a water content of less than 12 weight percent and preferably a maximum of 10 weight percent.

Another aspect of the invention discloses an imaging element comprising;

a support;

at least one image forming layer superposed on the support; and a layer superposed on said support, wherein the layer is derived from a coating composition comprising a solution of an electrically-conductive polymer and an organic solvent media, wherein the solvents are selected from the group consisting of alcohols, ketones, cycloalkanes, arenes, esters, glycol ethers and their mixtures; the media having a water content of less than 12 weight percent and preferably a maximum of 10 weight percent.

The coating composition of the present invention comprises an electrically-conductive polymer in an organic solvent media with reduced water content, and may optionally further comprise a film-forming binder and or other components, and thereby provides certain advantages over the teachings of the prior art. An organic solvent rich coating composition provides improved drying, a reduction in coating blush, enhanced compatibility with polymeric binders, and elimination of additional subbing layers on imaging supports.

In the known art, when water is not used as the second solvent for the film-forming binder (See, U.S. Pat. No. 5,716,550, for example), non-environmentally friendly chlorinated solvent systems such as dichloromethane, either by itself or in combination with methanol or acetone, are required for the film-forming binder. In the present invention, coating compositions employing more environmentally friendly solvent systems, such as acetone, can be used for the film-forming binder. Hence, the use of a chlorinated solvent is not required for the binder.

The present invention improves the manufacturability of imaging elements containing antistatic layers by employing novel coating compositions. For example, in certain manufacturing environments, drying capacities are limited, and the use of more volatile organic solvent rich coating formulations is required. Thus, to accommodate such manufacturing environments coating compositions employing low water contents are preferred. In addition, organic solvent rich coating compositions can eliminate the requirement of additional subbing layers on imaging supports and thereby lead to a simplification of the manufacturing process for the imaging element. Therefore, an aim of the present invention is to formulate coating compositions employing organic solvents in combination with a minimal amount of water that can provide electrically-conductive layers.

DETAILED DESCRIPTION OF THE INVENTION

The coating compositions and imaging elements of this invention can be of many different types depending on the particular use for which they are intended. Such imaging elements include, for example, photographic, electrostatographic, photothermographic, migration, electrothermographic, dielectric recording and thermal-dye-transfer imaging elements.

Photographic elements which can be provided with an antistatic layer in accordance with the coating composition of this invention can differ widely in structure and composition. For example, they can vary greatly in regard to the type of support, the number and composition of the image-forming layers, and the kinds of auxiliary layers that are included in the elements. In particular, the photographic elements can be still films, motion picture films, x-ray films, graphic arts films, paper prints or microfiche, especially CRT-exposed autoreversal and computer output microfiche films. They can be black-and-white elements, color elements adapted for use in a negative-positive process, or color elements adapted for use in a reversal process.

Photographic elements can comprise any of a wide variety of supports. Typical supports include cellulose nitrate film, cellulose acetate film, poly(vinyl acetal) film, polystyrene film, poly(ethylene terephthalate) film, poly(ethylene naphthalate) film, polycarbonate film, polyethylene films, polypropylene films, glass, metal, paper (both natural and synthetic), polymer-coated paper, and the like.

The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example, gelatin, gelatin derivatives, cellulose derivatives, polysaccharides such as dextran, gum arabic, and the like, and synthetic polymeric substances such as water-soluble polyvinyl compounds like poly(vinylpyrrolidone), acrylamide polymers, and the like. A particularly common example of an image-forming layer is a gelatin-silver halide emulsion layer.

In order to promote adhesion between the conductive layer of this invention and the support, the support can be surface-treated by various processes including corona discharge, glow discharge, UV exposure, flame treatment, electron-beam treatment, as described in U.S. Pat. No 5,718,995 or treatment with adhesion-promoting agents including dichloro- and trichloro-acetic acid, phenol derivatives such as resorcinol and p-chloro-m-cresol, solvent washing or overcoating with adhesion promoting primer or tie layers containing polymers such as vinylidene chloride-containing copolymers, butadiene-based copolymers, glycidyl acrylate or methacrylate-containing copolymers, maleic anhydride-containing copolymers, condensation polymers such as polyesters, polyamides, polyurethanes, polycarbonates, mixtures and blends thereof, and the like. In a preferred embodiment of the present invention, no additional treatment of the support surface is necessary to promote adhesion between the conductive layer of this invention and the support because of the solvent mixture employed in the coating composition. The additional functionality of the coating composition of the present invention leads to a simplification of the manufacturing process for imaging elements.

Further details with respect to the composition and function of a wide variety of different imaging elements are provided in U.S. Pat. No. 5,300,676 and references described therein which are incorporated herein by reference. All of the imaging processes described in the '676 patent, as well as many others, have in common the use of an electrically-conductive layer as an electrode or as an antistatic layer. The requirements for a useful electrically-conductive layer in an imaging environment are extremely demanding and thus the art has long sought to develop improved electrically-conductive layers exhibiting the necessary combination of physical, optical and chemical properties.

The coating composition of the invention can be applied to the aforementioned film or paper supports by any of a variety of well-known coating methods. Handcoating techniques include using a coating rod or knife or a doctor blade. Machine coating methods include skim pan/air knife coating, roller coating, gravure coating, curtain coating, bead coating or slide coating. Alternatively, the coating composition of the present invention can be applied to a single or multilayered polymeric web by any of the aforementioned methods, and the said polymeric web can subsequently be laminated (either directly or after stretching) to a film or paper support of an imaging element (such as those discussed above) by extrusion, calendering or any other suitable method, with or without suitable adhesion promoting tie layers.

The coating composition of the present invention can be applied to the support in various configurations depending upon the requirements of the specific application. As an abrasion resistant layer, the coating composition of the present invention is preferred to be applied as an outermost layer, preferably on the side of the support opposite to the imaging layer. However, the coating composition of the present invention can be applied at any other location within the imaging element, to fulfill other objectives. In the case of photographic elements, the coating composition can be applied to a polyester film base during the support manufacturing process, after orientation of the cast resin, and on top of a polymeric undercoat layer. The coating composition can be applied as a subbing layer under the sensitized emulsion, on the side of the support opposite the emulsion or on both sides of the support. Alternatively, it can be applied over the imaging layers on either or both sides of the support, particularly for thermally-processed imaging element. When the coating composition is applied as a subbing layer under the sensitized emulsion, it is not necessary to apply any intermediate layers such as barrier layers or adhesion promoting layers between it and the sensitized emulsion, although they can optionally be present. Alternatively, the coating composition can be applied as part of a multi-component curl control layer on the side of the support opposite to the sensitized emulsion. The present invention can be used in conjunction with an intermediate layer, containing primarily binder and antihalation dyes, that functions as an antihalation layer. Alternatively, these could be combined into a single layer. Detailed description of antihalation layers can be found in U.S. Pat. No. 5,679,505 and references therein which are incorporated herein by reference.

Typically, an antistatic layer may be used in a single or multilayer backing layer which is applied to the side of the support opposite to the sensitized emulsion. Such backing layers, which typically provide friction control and scratch, abrasion, and blocking resistance to imaging elements are commonly used, for example, in films for consumer imaging, motion picture imaging, business imaging, and others. In the case of backing layer applications, the antistatic layer can optionally be overcoated with an additional polymeric topcoat, such as a lubricant layer, and/or an alkali-removable carbon black-containing layer (as described in U.S. Pat. Nos. 2,271,234 and 2,327,828), for antihalation and camera- transport properties, and/or a transparent magnetic recording layer for information exchange, for example, and/or any other layer(s) for other functions.

In the case of photographic elements for direct or indirect x-ray applications, the antistatic layer can be applied as a subbing layer on either side or both sides of the film support. In one type of photographic element, the antistatic subbing layer is applied to only one side of the film support and the sensitized emulsion coated on both sides of the film support. Another type of photographic element contains a sensitized emulsion on only one side of the support and a pelloid containing gelatin on the opposite side of the support. An antistatic layer can be applied under the sensitized emulsion or, preferably, the pelloid. Additional optional layers can be present. In another photographic element for x-ray applications, an antistatic subbing layer can be applied either under or over a gelatin subbing layer containing an antihalation dye or pigment. Alternatively, both antihalation and antistatic functions can be combined in a single layer containing conductive material, antihalation dye, and a binder. This hybrid layer can be coated on one side of a film support under the sensitized emulsion.

It is also contemplated that the coating composition described herein can be used in imaging elements in which a relatively transparent layer containing magnetic particles dispersed in a binder is included. The coating composition of this invention functions well in such a combination and gives excellent photographic results. Transparent magnetic layers are well known and are described, for example, in U.S. Pat. No. 4,990,276, European Patent 459,349, and Research Disclosure, Item 34390, November, 1992, the disclosures of which are incorporated herein by reference. As disclosed in these publications, the magnetic particles can be of any type available such as ferro- and ferrimagnetic oxides, complex oxides with other metals, ferrites, etc. and can assume known particulate shapes and sizes, may contain dopants, and may exhibit the pH values known in the art. The particles may be shell coated and may be applied over the range of typical laydown.

Imaging elements incorporating coating compositions of this invention that are useful for other specific applications such as color negative films, color reversal films, black-and-white films, color and black-and-white papers, electrophotographic media, thermal dye transfer recording media etc., can also be prepared by the procedures described hereinabove. Other addenda, such as polymer latices to improve dimensional stability, hardeners or crosslinking agents, and various other conventional additives can be present optionally in any or all of the layers of the various aforementioned imaging elements.

The coating composition of the present invention comprises an electrically-conductive polymer, such as a substituted or unsubstituted pyrrole-containing polymer (as mentioned in U.S. Pat. Nos. 5,665,498 and 5,674,654), a substituted or unsubstituted thiophene-containing polymer (as mentioned in U.S. Pat. Nos. 4,731,408; 4,959,430; 4,987,042; 5,035,926; 5,300,575; 5,312,681; 5,354,613; 5,370,981; 5,372,924; 5,391,472; 5,403,467; 5,443,944; 5,463,056; 5,575,898; and 5,747,412), and/or a substituted or unsubstituted aniline-containing polymer (as mentioned in U.S. Pat. Nos. 5,716,550 and 5,093,439). Typically a polyanion is used with the electrically-conductive substituted or unsubstituted pyrrole or thiophene-containing polymer. Polyanions of polymeric carboxylic acids or of polymeric sulfonic acids, are described in U.S. Pat. No. 5,354,613 for thiophene based polymers. The relative amount of the polyanion component to the substituted or unsubstituted thiophene-containing polymer may vary from 85/15 to 50/50. The polymeric sulfonic acids are those preferred for this invention. The molecular weight of the polyacids providing the polyanions is preferably between 1,000 and 2,000,000, and is more preferably between 2,000 and 500,000. The polyacids or their alkali salts are commonly available, e.g., polystyrenesulfonic acids and polyacrylic acids, or they may be produced based on known methods. Instead of the free acids required for the formation of the electrically-conductive polymers and polyanions, mixtures of alkali salts of polyacids and appropriate amounts of monoacids may also be used. The electrically-conductive polymer and polyanion compound may be soluble or dispersible in water or organic solvents or mixtures thereof. The preferred electrically-conductive polymer for the present invention is a substituted thiophene-containing polymer known as poly(3,4-ethylene dioxythiophene styrene sulfonate).

An optional component further comprising the coating composition of the present invention is a film-forming binder. The presence of a film-forming binder, in such a solvent rich coating composition, aids in the abrasion resistance of the antistatic layer and the adhesion of the antistatic layer to the support. The choice of the film-forming binder is determined by the solvent system employed in the coating composition. Suitable binders are therefore limited to those which are soluble or dispersible in the solvent mixture of the coating composition.

U.S. Pat. Nos. 5,665,498 and 5,674,654 describe the use of a dispersion of poly(3,4-ethylene dioxypyrrole/styrene sulfonate) or polypyrrole/poly(styrene sulfonic acid) in a film-forming binder. A wide variety of useful binders in antistatic layers are mentioned in these patents. However, neither of these patents teaches the use of solvent rich coating compositions and binders appropriate for such solvent systems, nor is the use of solvent rich coating compositions with an electrically-conductive polymer and binder anticipated based on the purely aqueous coating compositions containing water-soluble or water-dispersible binders disclosed in these patents.

U.S. Pat. No. 5,354,613 describes the use of a polythiophene with conjugated polymer backbone in the presence of a polymeric polyanion compound and a hydrophobic organic polymer having a glass transition value (Tg) of at least 40° C. However, this patent never teaches the use of solvent rich coating compositions and hydrophobic organic polymer binders appropriate for use in such solvent systems with polythiophene and a polymeric polyanion. Also, the use of a solvent rich coating composition containing polythiophene and a binder for use as an antistatic layer is new teaching herein because U.S. Pat. No. 5,354,613 teaches only the use of an aqueous dispersion of the hydrophobic organic polymer in a primarily aqueous coating composition.

U.S. Pat. No. 5,300,575 describes a solution of a polythiophene and a polyanion with water or a mixture of water and a water-miscible organic solvent as the dispersing medium. While this patent teaches the use of binders such as polyvinylalcohol, polyvinylacetate, and polyurethane with the polythiophene to obtain good surface conductivities, these binders are either water-soluble or water-dispersible binders and are employed in primarily aqueous coating compositions containing a minimum water content of approximately 87 weight percent (see Example 8 in column 8, lines 5–13, of U.S. Pat. No. 5,300,575). The use of a polyurethane binder with polythiophene and a polyanion is also taught in combined magnetic and antistat layer 6.3 of Example 6 in column 7, lines 1–17, of U.S. Pat. No. 5,443,944. This coating composition employs a water content of approximately 37 weight percent, and is the minimum amount of water employed in the prior art for coating compositions containing polythiophene, a polyanion, and a binder. High electrical resistance or insufficient antistatic effects were observed with Example 6 of U.S. Pat. No. 5,443,944. Thus, the ability to utilize polythiophene and binder coating compositions with extremely low water contents and still obtain sufficient antistatic effects is unexpected based on the teachings of the prior polythiophene art.

U.S. Pat. Nos. 5,300,575 and 5,443,944 also teach the use of a binderless polythiophene antistatic layer, as does U.S. Pat. No. 5,370,981. A coating composition with a minimum water content of approximately 29 weight percent is shown for Antistatic layer 2a in Table 1, column 14, lines 55–67, of U.S. Pat. No. 5,300,575 and also for Antistatic layers 1–5 in Table 1, column 11, lines 50–60, of U.S. Pat. No. 5,370,981. Antistatic solution 2 in column 3, lines 64–68, of U.S. Pat. No. 5,443,944 employs a water content of approximately 12 weight percent, and is the minimum amount of water employed in the prior art for coating compositions containing only polythiophene and a polyanion.

U.S. Pat. No. 5,716,550 describes a coating composition comprising a solution of a complex of a polymeric polyaniline and a protonic acid dissolved in a first solvent having a Hansen polar solubility parameter of from 13 to about 17 $MPa^{1/2}$ and a Hansen hydrogen bonding solubility parameter of from about 5 to about 14 $MPa^{1/2}$, and a film-forming binder dissolved in a second solvent. The first solvent for the polyaniline-protonic acid complex is dimethylsulfoxide, a gamma-butyrolactone/lower alcohol blend, a propylene carbonate/lower alcohol blend, an ethylene carbonate/lower alcohol blend, a propylene carbonate/ethylene carbonate/lower alcohol blend, or a mixture thereof, wherein said lower alcohol has up to 4 carbon atoms. The second solvent for the film-forming binder is water, a chlorinated solvent, or a mixture of a chlorinated solvent with a lower alcohol or acetone, wherein said lower alcohol has up to 4 carbon atoms. The weight ratio of the second solvent to the first solvent is from about 5:1 to about 19: 1. With the solvent ratios of the first claim of U.S. Pat. No. 5,716,550, and as seen in Examples 17–22, when water is present in the electrically-conductive coating composition it will be present at levels between approximately 83 and 95 weight percent. Thus, lower water content coating compositions are not anticipated from this patent.

In addition, the present invention teaches that the electrically-conductive polymer can first be prepared in a simple, more environmentally friendly solvent mixture of methanol and low levels of water. Examples of the present invention utilize a solvent mixture of methanol and water with weight percentages of 76 and 24, respectively, for first preparing the poly(3,4-ethylene dioxythiophene styrene sulfonate). Such a solvent system has a Hansen polar solubility parameter of 13.0 $MPa^{1/2}$ and a Hansen hydrogen bonding solubility parameter of 26.3 $MPa^{1/2}$ and therefore lies outside of the range taught in U.S. Pat. No. 5,716,550 for the polyaniline-protonic acid complex. Once prepared in a methanol/water blend, the poly(3,4-ethylene dioxythiophene styrene sulfonate) solution can then be added to a solvent system, with or without a film-forming binder in the solvent system, to further reduce the overall water content of the final coating composition.

When water is not used as the second solvent for the film-forming binder in U.S. Pat. No. 5,716,550, non-environmentally friendly chlorinated solvent systems such as dichloromethane, either by itself or in combination with methanol or acetone, are required for the film-forming binder. As will be seen in the working examples of the present invention, coating compositions employing more environmentally friendly solvent systems, such as acetone, can be used for the film-forming binder. Hence, the use of a chlorinated solvent is not required for the binder in the present invention.

As the non-aqueous, organic solvent portion of the coating composition of the present invention, solvents such as alcohols, ketones, cycloalkanes, arenes, esters, glycol ethers and their mixtures are preferred. However, more preferred organic solvents for the practice of the present invention include acetone, methyl ethyl ketone, methanol, ethanol, butanol, Dowanol™ PM (1-methoxy-2-propanol or propylene glycol monomethyl ether), iso-propanol, propanol, toluene, xylene, methyl isobutyl ketone, n-propyl acetate, cyclohexane and their mixtures. Among all the organic solvents, acetone, methanol, ethanol, iso-propanol, Dowanol™ PM, butanol, propanol, cyclohexane, n-propyl acetate and their mixtures are most preferred. The relative amount of water in the final solvent mixture for the coating composition of the present invention is less than 12 weight percent of the total solvent and preferably a maximum of 10 weight percent of the total solvent.

In the present invention, the electrically-conductive polymer, polyanion compound and other components further comprising the coating composition, such as the film-forming binder, may be soluble or dispersible in the organic solvents and mixtures with minimal amounts of water. Examples of film-forming binders suitable for the present invention include, but are not limited to the following or mixtures of the following: cellulosic materials, such as cellulose esters and cellulose ethers; homopolymers or copolymers from styrene, vinylidene chloride, vinyl chloride, alkyl acrylate, alkyl methacrylate, acrylamide, methacrylamide, acrylonitrile, methacrylonitrile, vinyl ether, and vinyl acetate monomers; polyesters or copolyesters; polyurethanes or polyurethane acrylates; and polyvinylpyrrolidone. The preferred film-forming binder for the present invention is a cellulose ester and most preferred is cellulose diacetate.

According to the present invention, when a film-forming binder is included in the coating composition, it can be optionally crosslinked or hardened by adding a crosslinking agent to the coating composition. The crosslinking agent reacts with functional groups present in the film-forming binder, such as hydroxyl or carboxylic acid groups. Crosslinking agents, such as polyfunctional aziridines, carbodiimides, epoxy compounds, polyisocyanates, methoxyalkyl melamines, triazines, and the like are suitable for this purpose.

In a preferred embodiment of this invention, the relative amount of the electrically-conductive polymer can vary from 0.1–100 weight % and the relative amount of the film-forming binder can vary from 99.9–0 weight % in the dried layer. Most preferred is when the amount of electrically-conductive polymer is between 2 and 70 weight % and the film-forming binder is between 98 and 30 weight % in the dried layer.

In addition to film-forming binders, other components that are well known in the photographic art may also be present in the coating composition. These additional components include: surfactants and coating aids, dispersing aids, thickeners, coalescing aids, soluble and/or solid particle dyes, antifoggants, biocides, matte particles, lubricants, pigments, magnetic particles, and others.

The coating composition of this invention generally contains a limited amount of total solids including both the required components and the optional components. Usually the total solids is less than or equal to about 10 weight percent of the total coating composition. Preferably the total solids is between 0.01 and 10 weight percent.

The coating composition for the present invention is preferably coated at a dry weight coverage of between 0.005 and 10 $g/m^2$, but most preferably between 0.01 and 2 $g/m^2$.

The present invention is further illustrated by the following examples of its practice. However, the scope of this invention is by no means restricted to these specific examples.

EXAMPLES

Preparation of Coating Compositions

Materials

Electrically-conductive Polymers (ECPs)

The electrically-conductive polymers (ECPs) in the following examples include a polythiophene and a polypyrrole derivative. The polythiophene derivative is a commercially available 1.22 wt % aqueous solution of a substituted thiophene-containing polymer supplied by Bayer Corporation as Baytron™ P. This electrically-conductive polymer is based on an ethylene dioxythiophene in the presence of styrene sulfonic acid, and is henceforth referred to as EDOT. The polypyrrole derivative is a 1.85 wt % aqueous dispersion of polypyrrole/poly(styrene sulfonic acid) prepared, according to U.S. Pat. No. 5,674,654, by oxidative polymerization of pyrrole in aqueous solution in the presence of poly(styrene sulfonic acid), using ammonium persulfate as the oxidant. The polypyrrole-containing electrically-conductive polymer is henceforth referred to as PPy.

Film-forming Binders

The film-forming binders, optionally employed in the following examples of the present invention, consist of a variety of materials. These include cellulose esters such as cellulose acetate, cellulose acetate propionate, and cellulose nitrate; polymethylmethacrylate; a core-shell polymer particle; and a polyurethane. CA398-3 is cellulose acetate, while CAP504-0.2 is cellulose acetate propionate, and both are supplied by Eastman Chemical Company. CN40-60 is cellulose nitrate and is supplied by Societe Nationale Powders and Explosives. Elvacite™ 2041 is polymethylmethacrylate and is supplied by ICI Acrylics, Inc. AND is a core-shell polymer particle, such as those described in U.S. Pat. Nos. 5,597,680 and 5,597,681, having a core comprising polymethylmethacrylate and a shell comprising a copolymer of 90% by weight methylmethacrylate and 10% by weight methacrylic acid, with the core to shell weight ratio equal to 70/30. R9699 is a 40 wt % aqueous urethane/acrylic copolymer dispersion available from Zeneca Resins as NeoPac™ TR-9699.

Coating Compositions

Coating solutions of either the EDOT or PPy with or without the film-forming binders were prepared in an acetone/alcohol (methanol or methanol/ethanol)/water solvent mixture with each solvent's weight percentage of the total solvent shown in Table 1 for each of the binders employed. Also shown in Table 1 is the weight% of the EDOT or PPy and the film-forming binder in each of the example coating compositions. The EDOT or PPy can first be mixed with methanol and then added to an additional solvent system, either with or without a binder present in the solvent system.

TABLE 1

| Coating Solution | Film-Forming Binder | Wt % Binder In Ctg. Soln. | ECP | Wt % ECP In Ctg. Soln. | Acetone wt % of Coating Solvent | Methanol wt % of Coating Solvent | Ethanol wt % of Coating Solvent | Water wt % of Coating Solvent |
|---|---|---|---|---|---|---|---|---|
| Example 1 (Invention) | None | 0 | EDOT | 0.1 | 65 | 27 | 0 | 8 |
| Example 2 (Invention) | None | 0 | PPy | 0.18 | 65 | 25 | 0 | 10 |
| Example 3 (Invention) | CA398-3 | 0.73 | EDOT | 0.02 | 65 | 33 | 0 | 2 |
| Example 4 (Invention) | CA398-3 | 0.70 | EDOT | 0.05 | 65 | 31 | 0 | 4 |
| Example 5 (Invention) | CA398-3 | 0.65 | EDOT | 0.1 | 65 | 27 | 0 | 8 |
| Example 6 (Comparative) | CA398-3 | 0.65 | EDOT | 0.1 | 55 | 5 | 0 | 40 |
| Example 7 (Invention) | CA398-3 | 0.65 | PPy | 0.1 | 65 | 30 | 0 | 5 |
| Example 8 (Invention) | CAP504-0.2 | 0.65 | EDOT | 0.1 | 65 | 27 | 0 | 8 |
| Example 9 (Invention) | CN40-60 | 0.65 | EDOT | 0.1 | 65 | 26 | 1 | 8 |
| Example 10 (Invention) | Elvacite ™ 2041 | 0.65 | EDOT | 0.1 | 65 | 27 | 0 | 8 |
| Example 11 (Invention) | NAD | 0.65 | EDOT | 0.1 | 65 | 27 | 0 | 8 |
| Example 12 (Invention) | R9699 | 0.65 | EDOT | 0.1 | 65 | 26 | 0 | 9 |

Preparation and Testing of Sample Coatings

Preparation of Coatings

The coating solutions were applied to a cellulose triacetate support and dried at 125° C. for one minute to give transparent antistatic coatings with total dry coating weights and percentages of EDOT or PPy and binder as shown in Tables 2 and 3. For some coatings in Table 3, an overcoat solution of 3 wt % CA398-3 in an acetone/methanol solvent mixture was applied over the underlying antistatic coating and dried under similar conditions to yield an overcoat with a dry coating weight of 0.65 g/m$^2$.

Resistivity Testing

The surface electrical resistivity (SER) of the antistatic coatings was measured at 50% RH and 72° F. with a Kiethley Model 616 digital electrometer using a two point DC probe method similar to that described in U.S. Pat. No. 2,801,191. Internal resistivity or "water electrode resistivity" (WER) was measured by the procedures described in R.

A. Elder, "Resistivity Measurements on Buried Conductive Layers", EOS/ESD Symposium Proceedings, September 1990, pages 251–254, for the overcoated antistatic coatings. In some cases, SER was measured both prior to and after C-41 photographic processing of the antistatic coatings to assess the "process survivability" of the antistatic coating.

Abrasion Resistance Testing

Dry abrasion resistance was evaluated by scratching the surface of the coating with a fingernail. The relative amount of coating debris generated is a qualitative measure of the dry abrasion resistance. Samples were rated either good, when no debris was seen, or poor, when debris was seen.

Coatings

Antistatic coatings, as shown in Coatings 1–12 in Table 2, were prepared from the corresponding coating solutions, Examples 1–12 in Table 1. Details about the dry coating composition, total nominal dry coverage, and the corresponding SER values before and, when measured, after C-41 photographic processing of these coatings are provided in Table 2.

TABLE 2

| Antistatic Coating | Coating Solution From Table 1 | Conductive Polymer Dry wt % In Coating | Film-Forming Binder Dry wt % In Coating | Total Dry Coverage g/m$^2$ | SER log Ω/□ Before C-41 Processing | SER log Ω/□ After C-41 Processing |
|---|---|---|---|---|---|---|
| Coating 1 | Example 1 (Invention) | EDOT 100 | None 0 | 0.02 | 7.2 | |
| Coating 2 | Example 2 (Invention) | PPy 100 | None 0 | 0.04 | 8.6 | |
| Coating 3 | Example 3 (Invention) | EDOT 3 | CA398-3 97 | 0.16 | 9.9 | |
| Coating 4 | Example 4 (Invention) | EDOT 7 | CA398-3 93 | 0.16 | 8.6 | |
| Coating 5 | Example 5 (Invention) | EDOT 13 | CA398-3 87 | 0.16 | 6.9 | 7.9 |
| Coating 6 | Example 6 (Compara-) tive) | EDOT 13 | CA398-3 87 | 0.16 | White, chalky Coating | |
| Coating 7 | Example 7 (Invention) | PPy 13 | CA398-3 87 | 0.16 | 95 | 11.4 |
| Coating 8 | Example 8 (Invention) | EDOT 13 | CAP504-0.2 87 | 0.16 | 6.4 | 9.0 |
| Coating 9 | Example 9 (Invention) | EDOT 13 | CN40-60 87 | 0.16 | 7.7 | 9.2 |
| Coating 10 | Example 10 (Invention) | EDOT 13 | Elvacite ™ 2041 87 | 0.16 | 6.3 | 9.0 |

TABLE 2-continued

| Antistatic Coating | Coating Solution From Table 1 | Conductive Polymer Dry wt % In Coating | Film-Forming Binder Dry wt % In Coating | Total Dry Coverage g/m$^2$ | SER log Ω/□ Before C-41 Processing | SER log Ω/□ After C-41 Processing |
|---|---|---|---|---|---|---|
| Coating 11 | Example 11 (Invention) | EDOT 13 | NAD 87 | 0.16 | 8.9 | 8.6 |
| Coating 12 | Example 12 (Invention) | EDOT 13 | R9699 87 | 0.16 | 7.6 | 8.5 |

It is clear that all of the above coatings, prepared according to the coating compositions of the present invention, with EDOT or PPy as the electrically-conductive polymer either without any binder, as seen in Coatings 1 and 2, or with the various film-forming binders, as seen in Coatings 3–5 and Coatings 7–12, have excellent conductivity before C-41 processing. In addition, conductivity values after C-41 processing were measured for Coating 5 and Coatings 7–12, and the low SER values indicate that these coatings are effective as "process-surviving" antistatic layers which can be used as outermost layers without any protective topcoat to serve as a barrier layer. Results for comparative Coating 6 indicate that when the same cellulosic binder, CA398-3, is used with the same electrically-conductive polymer, EDOT, but the solvent composition contains 40 weight percent water (thereby not falling within the claims of the current invention) a transparent, colorless antistatic layer cannot be prepared.

Antistatic coatings, either with or without a subsequent overcoat, were prepared as shown in Coatings 13–16 in Table 3. The initial antistatic layers in Coatings 13 and 15 were prepared from the coating solution, Example 1 in Table 1. This coating solution, according to the present invention, contains EDOT as the conductive polymer with no binder. The initial antistatic layers in Coatings 14 and 16 were prepared from the coating solution, Example 5 in Table 1. This coating solution, according to the present invention, contains EDOT as the conductive polymer with CA398-3 as the film-forming binder. No overcoat layer is present for Coatings 13 and 14, while an overcoat layer of CA398-3 is present in Coatings 15 and 16. Details about the dry coating composition and total nominal dry coverage of the antistatic and overcoat layers are provided in Table 3. In addition, the corresponding SER and WER values before C-41 processing and performance in terms of the amount of coating removed during abrasion resistance testing are provided in Table 3.

TABLE 3

| Coating | Coating Solution From Table 1 | Conductive Polymer Dry wt % In Coating | Film-Forming Binder Dry wt % In Coating | Antistat Total Dry Coverage g/m$^2$ | Overcoat Total Dry Coverage g/m$^2$ | SER log Ω/□ | WER logΩ/□ | Abrasion Resistance |
|---|---|---|---|---|---|---|---|---|
| Coating 13 | Example 1 (Invention) | EDOT 100 | None 0 | 0.02 | None 0 | 7.2 | | Poor |
| Coating 14 | Example 5 (Invention) | EDOT 13 | CA398-3 87 | 0.16 | None 0 | 7.3 | | Good |
| Coating 15 | Example 1 (Invention) | EDOT 100 | None 0 | 0.02 | CA398-3 0.65 | | 6.1 | Good |
| Coating 16 | Example 5 (Invention) | EDOT 13 | CA398-3 87 | 0.16 | CA398-3 0.65 | | 6.3 | Good |

It is clear that all of the above coatings, prepared according to the coating compositions of the present invention, with EDOT as the electrically-conductive polymer, either with or without a film-forming binder, have excellent conductivity when used as an outermost layer (Coatings 13 and 14) or when overcoated with a protective topcoat (Coatings 15 and 16). However, when the electrically-conductive polymer EDOT is used without a film-forming binder as an outermost layer there is a compromise in the abrasion resistance, as seen in Coating 13. As discussed in U.S. Pat. No. 5,354,613, an outermost layer of EDOT without a binder will also be prone to sticking to a normally hardened gelatin-silver halide emulsion layer at high relative humidity. Thus, a preferred embodiment of the present invention as an outermost abrasion resistant layer, requires the use of a film-forming binder in the coating composition. Addition of the film-forming binder improves the abrasion resistance but does not degrade the conductivity, as is evident when Coating 14 is compared with Coating 13. While the previous polythiophene patent literature (see for example U.S. Pat. No. 5,300,575) teaches overcoating a binderless polythiophene antistat layer with a cellulosic material to improve abrasion resistance (as seen in Table 3 when Coating 15 is compared with Coating 13), Coating 14, prepared from coating solution, Example 5, of the present invention, shows that this is not necessary. However, if an additional overcoat is desired, Coating 16 indicates that doing so does not degrade either the conductivity or abrasion resistance, when compared with the case of a binderless polythiophene antistat layer, as seen for Coating 15.

The invention has been described in detail with particular reference to certain preferred embodiments thereof, but it will be understood that variations and modifications can be effected within the spirit and scope of the invention.

What is claimed is:

1. A coating composition comprising a solution of an electronically-conductive polymer and an organic solvent media wherein the solvents are selected from the group consisting of alcohols, ketones, cycloalkanes, arenes, esters, glycol ethers and their mixtures; wherein the organic solvent media has a maximum water content of 10 weight percent.

2. The coating composition of claim 1 wherein the solvents are selected from the group consisting of acetone, methyl ethyl ketone, methanol, ethanol, butanol, propylene glycol monomethyl ether, iso-propanol, propanol, toluene, xylene, methyl isobutyl ketone, n-propyl acetate, cyclohexane and their mixtures.

3. The coating composition of claim 1 wherein the electronically-conductive polymer is selected from the group consisting of a substituted or unsubstituted pyrrole-containing polymer, a substituted or unsubstituted thiophene-containing polymer and a substituted or unsubstituted aniline-containing polymer.

4. The coating composition of claim 1 wherein the electronically-conductive polymer is a substituted thiophene-containing polymer.

5. The coating composition of claim 1 wherein the electronically-conductive polymer is poly(3,4-ethylene dioxythiophene styrene sulfonate).

6. The coating composition of claim 1 wherein the amount of electronically-conductive polymer in the total solids content of the said coating composition is from 0.1–100 weight percent.

7. The coating composition of claim 1 wherein the amount of electronically-conductive polymer is between 2 and 70 weight percent of the total solids content of the said coating composition.

8. The coating composition of claim 1 further comprising a film-forming binder in an amount of up to 99.9 weight percent of the total solids content of the said coating composition.

9. The coating composition of claim 8 wherein the film-forming binder is between 98 and 30 weight percent of the total solids content of the said coating composition.

10. The coating composition of claim 8 wherein the film-forming binder is a cellulose ester.

11. The coating composition of claim 8 wherein the film-forming binder is cellulose diacetate.

12. The coating composition of claim 1 further comprising addenda selected from the group consisting of surfactants, coating aids, dispersing aids, thickeners, coalescing aids, crosslinking agents or hardeners, soluble particle dyes, solid particle dyes, antifoggants, biocides, matte particles, lubricants, pigments and magnetic particles.

13. The coating composition of claim 1 containing total solids in an amount less than or equal to about 10 weight percent of the total coating composition.

14. The coating composition of claim 1 wherein the organic solvent media has a maximum water content of 9 weight percent.

15. The coating composition of claim 1 wherein the organic solvent media has a maximum water content of 8 weight percent.

16. The coating composition of claim 1 wherein the organic solvent media has a maximum water content of 5 weight percent.

17. The coating composition of claim 1 wherein the organic solvent media has a maximum water content of 4 weight percent.

18. The coating composition of claim 1 wherein the organic solvent media has a maximum water content of 2 weight percent.

* * * * *